US009280926B2

(12) United States Patent
Hwang et al.

(10) Patent No.: US 9,280,926 B2
(45) Date of Patent: Mar. 8, 2016

(54) CONTROL BOARD AND DISPLAY DEVICE USING THE SAME

(71) Applicant: Samsung Display Co., Ltd., Yongin (KR)

(72) Inventors: Jun-Ho Hwang, Asan-si (KR); Kihyun Pyun, Goyang-si (KR); Seung-Woon Shin, Asan-si (KR); Jang-Mi Lee, Busan (KR)

(73) Assignee: Samsung Display Co., Ltd., Yongin-si (KR)

( * ) Notice: Subject to any disclaimer, the term of this patent is extended or adjusted under 35 U.S.C. 154(b) by 106 days.

(21) Appl. No.: 14/155,959

(22) Filed: Jan. 15, 2014

(65) Prior Publication Data

US 2015/0035817 A1 Feb. 5, 2015

(30) Foreign Application Priority Data

Aug. 2, 2013 (KR) ........................ 10-2013-0092183

(51) Int. Cl.

| | |
|---|---|
| ***G09G 3/36*** | (2006.01) |
| ***G06F 3/038*** | (2013.01) |
| ***G09G 5/00*** | (2006.01) |
| ***G09G 3/20*** | (2006.01) |

(52) U.S. Cl.

CPC ................ *G09G 3/2092* (2013.01); *G09G 3/20* (2013.01); *G09G 2300/0426* (2013.01); *G09G 2370/08* (2013.01)

(58) Field of Classification Search

CPC ........ G02F 1/13; G09G 3/20; G09G 2370/08; G09G 2300/0426; G09G 3/2092

See application file for complete search history.

(56) References Cited

U.S. PATENT DOCUMENTS

| | | | | |
|---|---|---|---|---|
| 5,142,386 | A | 8/1992 | Ishihara | |
| 7,123,252 | B1 | 10/2006 | Baek | |
| 7,439,936 | B2 | 10/2008 | Kinugasa et al. | |
| 2005/0264471 | A1 | 12/2005 | Yamazaki et al. | |
| 2007/0040762 | A1 | 2/2007 | Shigehiro | |
| 2010/0149083 | A1 * | 6/2010 | Park et al. | 345/99 |
| 2012/0313922 | A1 * | 12/2012 | Toyomura et al. | 345/212 |

FOREIGN PATENT DOCUMENTS

| | | |
|---|---|---|
| JP | 2006-064912 | 3/2006 |
| JP | 2008-096740 | 4/2008 |
| JP | 2011-150306 | 8/2011 |
| JP | 2012-237868 | 12/2012 |

* cited by examiner

*Primary Examiner* — Charles V Hicks

(74) *Attorney, Agent, or Firm* — H.C. Park & Associates, PLC

(57) ABSTRACT

A control board in a display device includes terminals and a control circuit. The control circuit is configured to output a control signal an image signal through the terminals and to generate a drive voltage in response to a feedback signal, which is fed back to a second terminal of the terminals when a source voltage is applied to a first terminal of the terminals.

20 Claims, 8 Drawing Sheets

CONTROL BOARD AND DISPLAY DEVICE USING THE SAME

CROSS-REFERENCE TO RELATED APPLICATION

This U.S. non-provisional patent application claims priority from and the benefit of Korean Patent Application No. 10-2013-0092183, filed on Aug. 2, 2013, which is hereby incorporated by reference for all purposes as if fully set forth herein.

BACKGROUND

1. Field

Exemplary embodiments of the present invention relate to a display device. More particularly, exemplary embodiments of the present relate to a display device having a control board.

2. Discussion of the Background

In recent years, various display devices, such as a liquid crystal display, a field emission display, a plasma display panel, an organic light emitting display, etc., haven been widely used. Such display devices are applied to various image display devices, e.g., a television set, a computer monitor, etc., to display images and text. In particular, an active-matrix type liquid crystal display that drives liquid crystal cells using thin film transistors has advantages, such as superior image quality, low power consumption, etc., and have recently been further developed to have larger sizes and high definition.

Display devices employing various types of display panels have been developed and produced in accordance with the development of the display device. Accordingly, a control board used for various types of display panels is required.

The above information disclosed in this Background section is only for enhancement of understanding of the background of the invention and, therefore, it may contain information that does not constitute prior art.

SUMMARY

Exemplary embodiments of the present invention provide a control board used for various types of display panels.

Exemplary embodiments of the present invention also provide a display device having the control board.

Additional features of the invention will be set forth in the description which follows, and in part will become apparent from the description, or may be learned from practice of the invention.

An exemplary embodiment of the present invention discloses a control board including a control circuit. The control circuit outputs a control signal and an image signal through terminals, and generates a drive voltage in response to a feedback signal feedback to a second terminal of the terminals when a source voltage is applied to a first terminal of the terminals.

An exemplary embodiment of the present invention also discloses a display device including a display panel, a printed circuit board that includes a driving circuit to drive the display panel and first and second terminals, and a control board that includes a third terminal connected to the first terminal and a fourth terminal connected to the second terminal. The control board generates a drive voltage in response to a feedback signal feedback to the fourth terminal when a source voltage is applied to the third terminal. The printed circuit board includes a signal line to electrically connect the first terminal and the second terminal according to a type of the display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
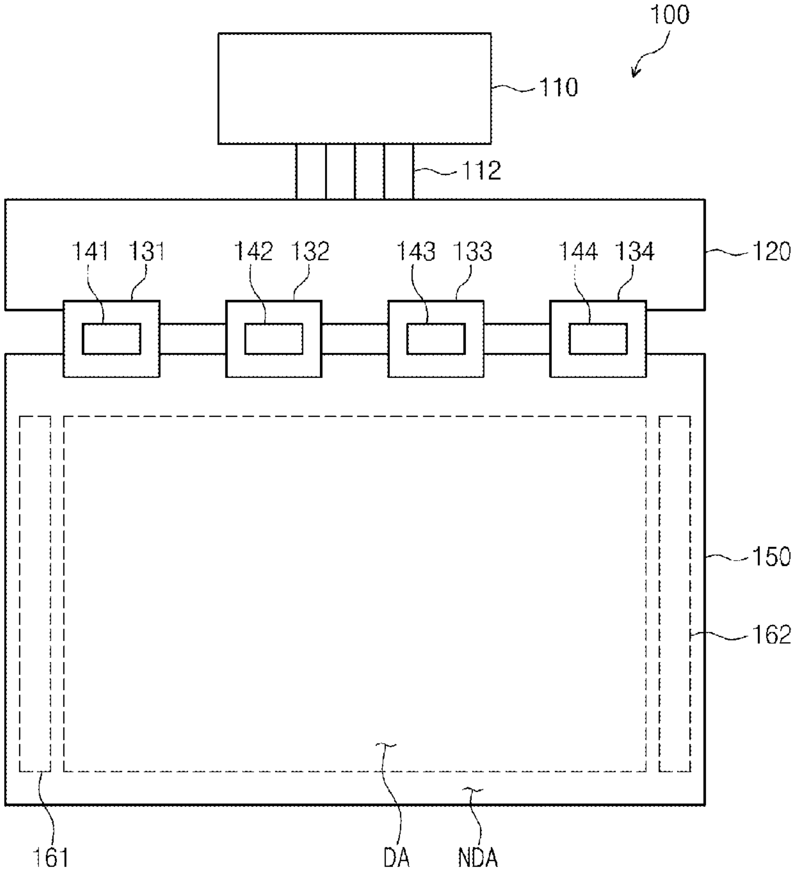
FIG. 1 is a plan view showing a display device according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of elements may be exaggerated for clarity. Like reference numerals in the drawings denote like elements.

It will be understood that when an element or layer is referred to as being “on”, “connected to”, or “coupled to” another element or layer, it can be directly on, connected to, or coupled to the other element or layer, or intervening elements or layers may be present. In contrast, when an element is referred to as being “directly on,” “directly connected to”, or “directly coupled to” another element or layer, there are no intervening elements or layers present. As used herein, the term “and/or” includes any and all combinations of one or more of the associated listed items. It will be understood that for the purposes of this disclosure, “at least one of X, Y, and Z” can be construed as X only, Y only, Z only, or any combination of two or more items X, Y, and Z (e.g., XYZ, XYY, YZ, ZZ).

It will be understood that, although the terms first, second, etc. may be used herein to describe various elements, components, regions, layers and/or sections, these elements, components, regions, layers, and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as “beneath”, “below”, “lower”, “above”, “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the exemplary term “below” can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, “a”, “an” and “the” are intended to include the plural forms as well, unless the context clearly indicates otherwise. It will be further understood that the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

FIG. 1 is a plan view showing a display device 100 including a control board 110, a printed circuit board 120, data driving circuits 131 to 134, a display panel 150, and gate driving circuits 161 and 162. The display device 100 may be a liquid crystal display, a plasma display panel, an organic light emitting display, or a field emission display.

The control board 110 is electrically connected to the printed circuit board 120 by a cable 112. The control board 110 applies image data and control signals to the data driving circuits 131 to 134 through the cable 112. The control signals applied to the data driving circuits 131 to 134 from the control board 110 include a horizontal synchronization start signal, a clock signal, and a line latch signal.

The printed circuit board 120 includes various circuits to drive the display panel 150. The printed circuit board 120 includes wirings connected between the control board 110 and the data driving circuits 131 to 134.

Each of the data driving circuits 131 to 134 is packaged in a tape carrier package (TCP) or a chip-on-film package (COF), and data driving integrated circuits 141 to 144 are mounted on the data driving circuits 131 to 134, respectively. The data driving integrated circuits 141 to 144 may be directly mounted on the display panel 150 rather than on the printed circuit board 120.

The display panel 150 includes a display area DA in which pixels are arranged and a non-display area NDA disposed adjacent to the display area DA. An image is displayed in the display area DA, and is not displayed in the non-display area NDA. The display panel 100 is configured to include a glass substrate, a silicon substrate, or a film substrate.

The gate driving circuits 161 and 162 are presented in a circuit made of oxide semiconductor, amorphous silicon gate, crystalline semiconductor, or polycrystalline semiconductor and integrated in the non-display area NDA. The gate driving circuits 161 and 162 are disposed at first and second sides of the display panel 150, while interposing the display area DA of the display panel 150 therebetween.

Figure 2:
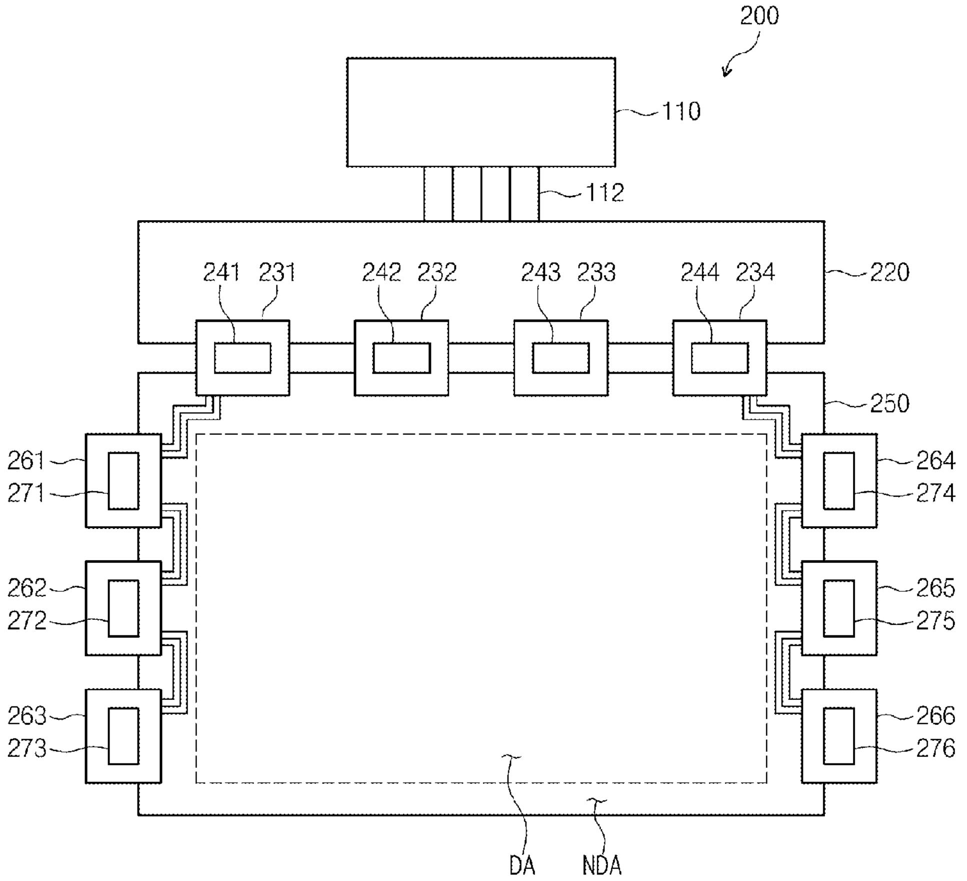
FIG. 2 is a plan view showing a display device, to which a control board shown in FIG. 1 is applied, according to an exemplary embodiment of the present invention.

FIG. 2 is a plan view showing a display device 200, to which the control board 110 shown in FIG. 1 is applied. The display device 200 includes a printed circuit board 220, data driving circuits 231 to 234, a display panel 250, and gate driving circuits 261 to 266.

Each of the gate driving circuits 261 to 266 is packaged in a TCP or a COF, and the gate driving circuits 261 to 266 are mounted on both sides of the display panel 250. That is, the gate driving circuits 261 to 263 are mounted on the first side of the display panel 250, and the gate driving circuits 264 to 266 are mounted on the second side of the display panel 250.

As shown in FIG. 1, when the control board 110 is connected to the printed circuit board 120 connected to a first type of display panel 150 including the gate driving circuits 161 and 162 presented in a circuit made of an oxide semiconductor, an amorphous silicon gate, a crystalline semiconductor, or a polycrystalline semiconductor, the control board 110 is driven in a first mode to generate signals suitable for the first type of display panel 150. For instance, the control board 110 may generate a gate clock signal CKV swung between a voltage of about −12 volts and a voltage of about 30 volts, which is suitable for the gate drivers 161 and 162.

As shown in FIG. 2, when the control board 110 is connected to the printed circuit board 220 connected to a second type of display panel 250 including the gate driving circuits 261 to 266 packaged in the TCP or the COF, the control board 110 is driven in a second mode to generate signals suitable for the second type of display panel 250. For instance, the control board 110 may generate a gate pulse signal CPV swung between a voltage of about 0 volts and a voltage of about 3.3 volts, which is suitable for the gate drivers 261 and 166.

The control board 110 outputs the gate clock signal CKV during the first mode and outputs the gate pulse signal CPV during the second clock signal through the same output terminal.

When the control board 110 driven in the first mode is connected to the second type of display panel 250 while the display devices 100 and 200 are produced or repaired, for example, the data driving circuits 261 to 266 may be damaged as a result of the application of a high voltage of about 30 volts to the data driving circuits 261 to 266 mounted on the display panel 250.

Figure 3:
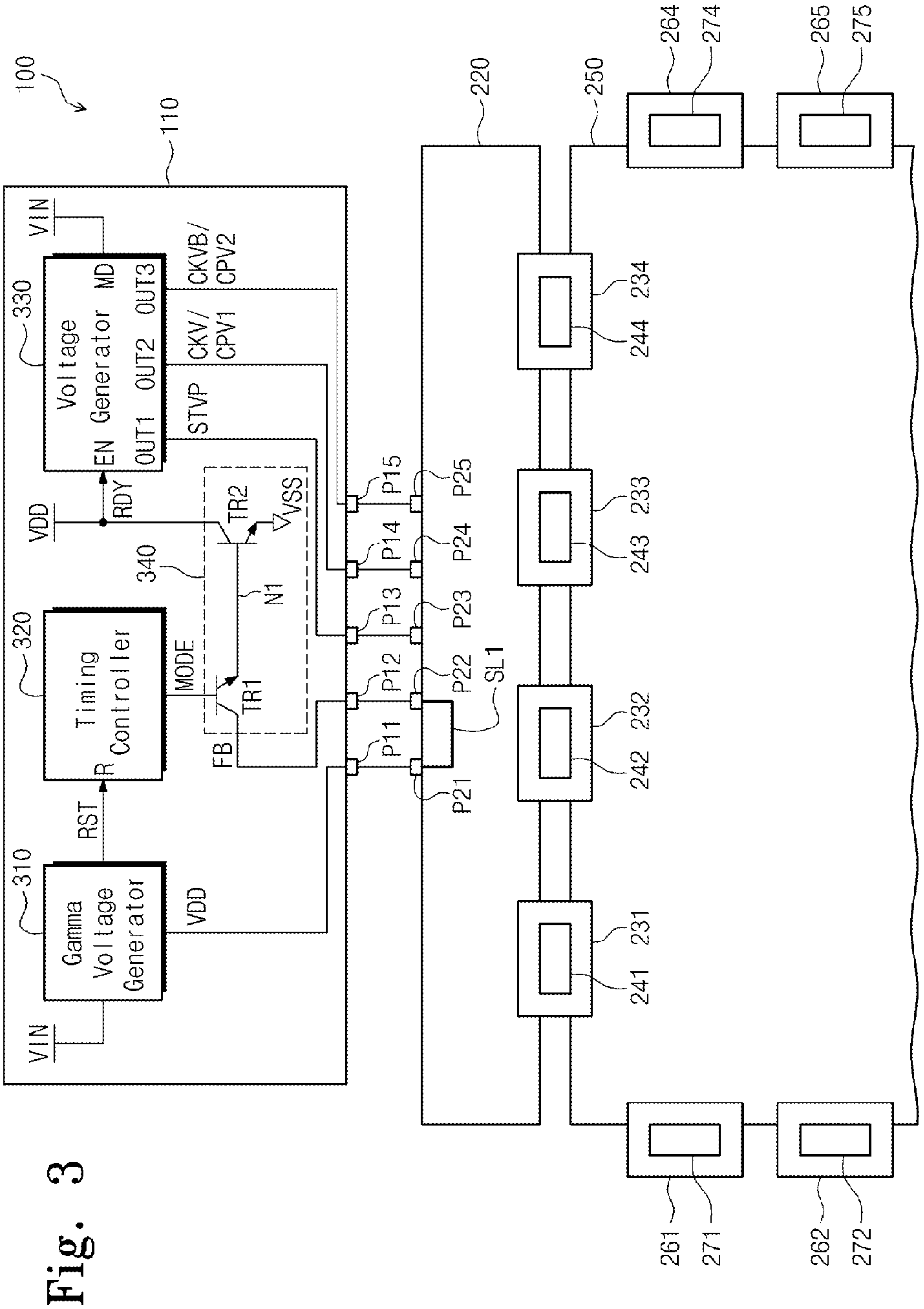
FIG. 3 is a plan view showing the control board and a printed circuit board shown in FIG. 2.

FIG. 3 is a plan view showing the control board and the printed circuit board shown in FIG. 2. The control board 110 of the display device 200 includes a control circuit configured to include a gamma voltage generator 310, a timing controller 320, a voltage generator 330, a switching part 340, and first to fifth terminals P11 to P15.

The gamma voltage generator 310 generates a source voltage VDD in response to an input voltage VIN, and applies a reset signal RST to the timing controller 320. The source voltage VDD generated by the gamma voltage generator 310 is applied to the first terminal P11.

The timing controller 320 is driven by the reset signal RST applied through a reset terminal R thereof, and outputs a mode signal MODE. The mode signal MODE represents a drive mode of the control board 110. For instance, when the control board 110 is driven in the first mode suitable for the display panel 150 shown in FIG. 1, the mode signal MODE is set to a first level. On the other hand, when the control board 110 is driven in the second mode suitable for the display panel 250 shown in FIG. 2, the mode signal MODE is set to a second level.

The voltage generator 330 includes an enable terminal EN, a mode terminal MD, and output terminals OUT1, OUT2, and OUT3. The voltage generator 330 is driven in response to a ready signal RDY applied through the enable terminal EN in accordance with a signal applied through the mode terminal MD. In detail, when the signal applied through the mode terminal MD has a level of the input voltage VIN that indicates the first mode, the voltage generator 330 is driven in response to the ready signal RDY applied through the enable terminal EN. When the signal applied through the mode terminal MD has the level of the input voltage VIN that indicates the first mode, and the ready signal RDY applied through the enable terminal EN has a level of the source voltage VDD, the voltage generator 330 outputs a start pulse signal STVP, a first gate clock signal CKV, and a second gate clock signal CKVB, which are suitable for the first mode, through the output terminals OUT1, OUT2, and OUT3, respectively. When the signal applied through the mode terminal MD has the level of the input voltage VIN that indicates the first mode and the ready signal RDY applied through the enable terminal EN does not have the level of the source voltage VDD, the voltage generator 330 does not output any signal through the output terminals OUT1, OUT2, and OUT3.

When the signal applied through the mode terminal MD does not have the level of the input voltage VIN, the voltage generator 330 is driven in the second mode. The voltage generator 330 ignores the ready signal RDY applied through the enable terminal EN during the second mode. That is, during the second mode, the voltage generator 330 outputs the start pulse signal STVP, the first gate pulse signal CPV1, and the second gate pulse signal CPV2, which are suitable for the second mode, through the output terminals OUT1, OUT2, and OUT3, respectively, regardless of the ready signal RDY applied through the enable terminal EN.

The signals output through the output terminals OUT1, OUT2, and OUT3, which depend on the levels of the signals input to the mode terminal MD and the enable terminal EN of the voltage generator 330, are as shown in Table.

TABLE

| Mode terminal (MD) | Enable terminal (EN) | Output terminals (OUT1, OUT2, OUT3) |
|---|---|---|
| VIN | VDD | STVP, CKV, CKVB |
| VIN | VSS | No output |
| VSS | Don't care | STVP, CPV1, CPV2 |

The switching part 340 includes a first transistor TR1 and a second transistor TR2. The first transistor TR1 includes a first electrode connected to a feedback signal FB provided through the second terminal P12, a second electrode connected to a first node N1, and a gate electrode connected to the mode signal MODE output from the timing controller 320. The second transistor TR2 includes a first electrode connected to the source voltage VDD, a second electrode connected to a ground voltage VSS, and a gate electrode connected to the first node.

The printed circuit board 220 includes first to fifth terminals P21 to P25. The printed circuit board 220 connected to the second type of display panel 250 including the gate driving circuits 261 to 266, which are packaged in the TCP or the COF, includes a signal line SL1 to electrically connect the first terminal P21 and the second terminal P22.

When the first to fifth terminals P11 to P15 of the control board 110 are respectively connected to the first to fifth terminals P21 to P25 of the printed circuit board 220, the source voltage VDD generated by the gamma voltage generator 310 is applied to the switching part 340 as the feedback signal FB through the first terminal P11 of the control board 110, the first terminal P21 of the printed circuit board 220, the signal line SL1, the second terminal P22 of the printed circuit board 220, and the second terminal P12 of the control board 110.

Because the timing controller 320 driven in the first mode outputs the mode signal MODE at a high level, the first transistor TR1 of the switching part 340 is turned on. Accordingly, the feedback signal FB having the level of the source voltage VDD is applied to the gate electrode of the second transistor TR2, and thus the second transistor TR2 is turned on.

The input voltage VIN is applied to the mode terminal MD of the voltage generator 330, and thus the voltage generator 330 is prepared to be driven in response to the ready signal RDY input to the enable terminal EN.

When the second transistor TR2 is turned on, the ready signal RDY input to the enable terminal EN of the voltage generator 330 is brought to the level of the ground voltage VSS. Therefore, the voltage generator 330 does not output any signal through the output terminals OUT1, OUT2, and OUT3.

That is, when the control board 110 driven in the first mode is connected to the second type of display panel 250, the voltage generator 330 of the control board 110 stops generating any voltage. Thus, the gate driving circuits 261 to 266 of the display panel 250 may be prevented from being damaged as a result of the first and second gate clock signals CKV and CKVB having a high voltage level.

Figure 4:
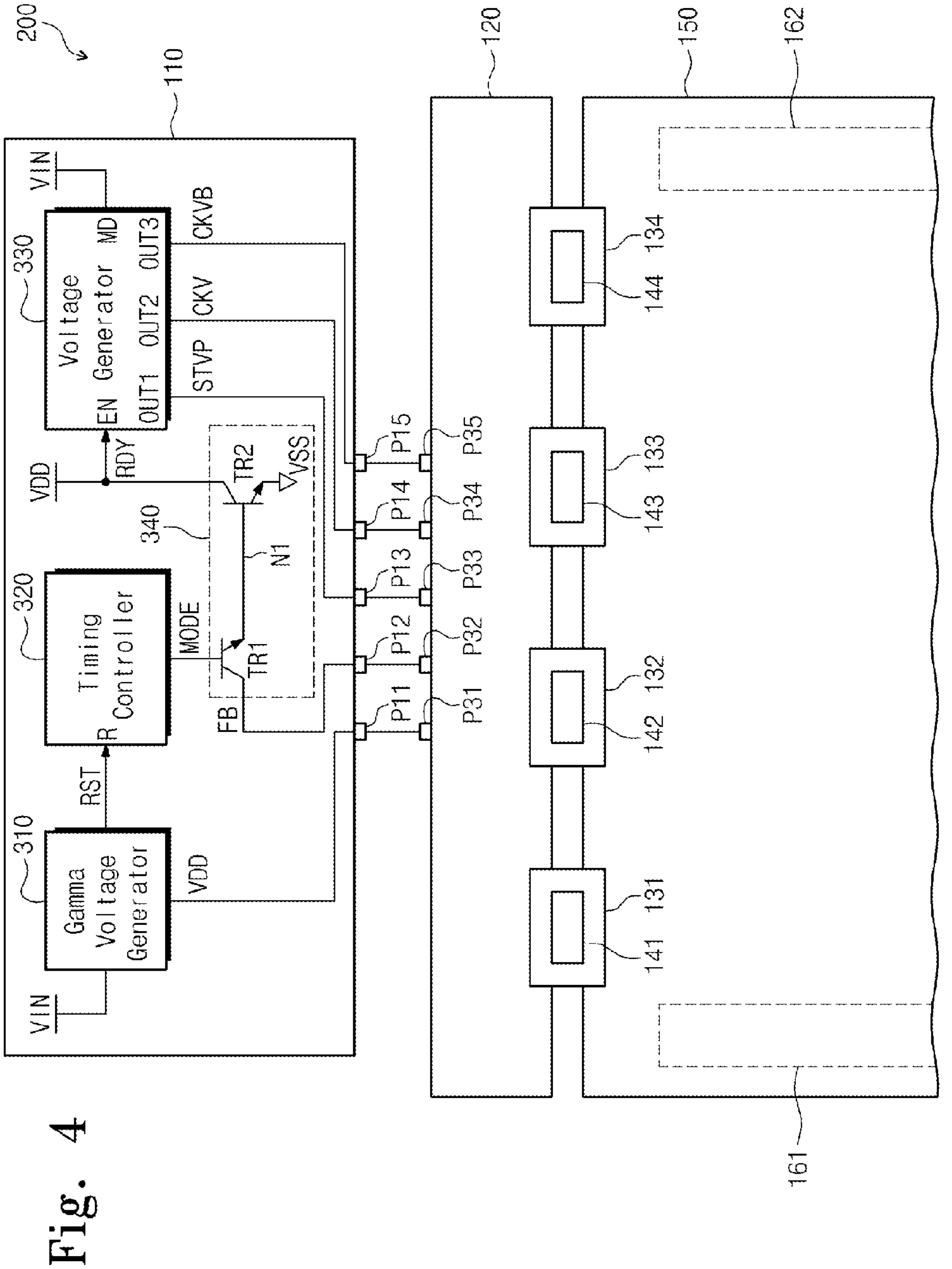
FIG. 4 is a plan view showing a type of display panel shown in FIG. 1, which is connected to the control board shown in FIG. 3.

FIG. 4 is a plan view showing the first type of display panel shown in FIG. 1, which is connected to the control board shown in FIG. 3. The printed circuit board 120 connected to the display panel 150 including the gate driving circuits 161 and 162, which are packaged in a circuit made of an oxide semiconductor, an amorphous silicon gate, a crystalline semiconductor, or a polycrystalline semiconductor, includes first to fifth terminals P31 to P35.

Unlike the printed circuit board 220 shown in FIG. 3, the printed circuit board 120 does not include a signal line used to connect the first terminal P31 and the second terminal P32. Therefore, although the terminals P11 to P15 of the control board 110 are electrically connected to the terminals P31 to P35 of the printed circuit board 120, respectively, the feedback signal FB provided through the second terminal P12 of the control board 110 is maintained in a floating state. Accordingly, although the first transistor TR1 of the switching part 340 is turned on, the ready signal RDY is maintained at the level of the source voltage VDD, since the second transistor TR2 is not turned on. Thus, the voltage generator 330 outputs the start pulse signal STVP, the first gate clock signal CKV, and the second clock signal CKVB suitable for the first type of display panel 150 through the output terminals OUT1, OUT2, and OUT3, respectively. In other exemplary embodiments, the second terminal P32 of the printed circuit board 120 may be connected to the ground voltage VSS through a pull-down resistor.

Figure 5:
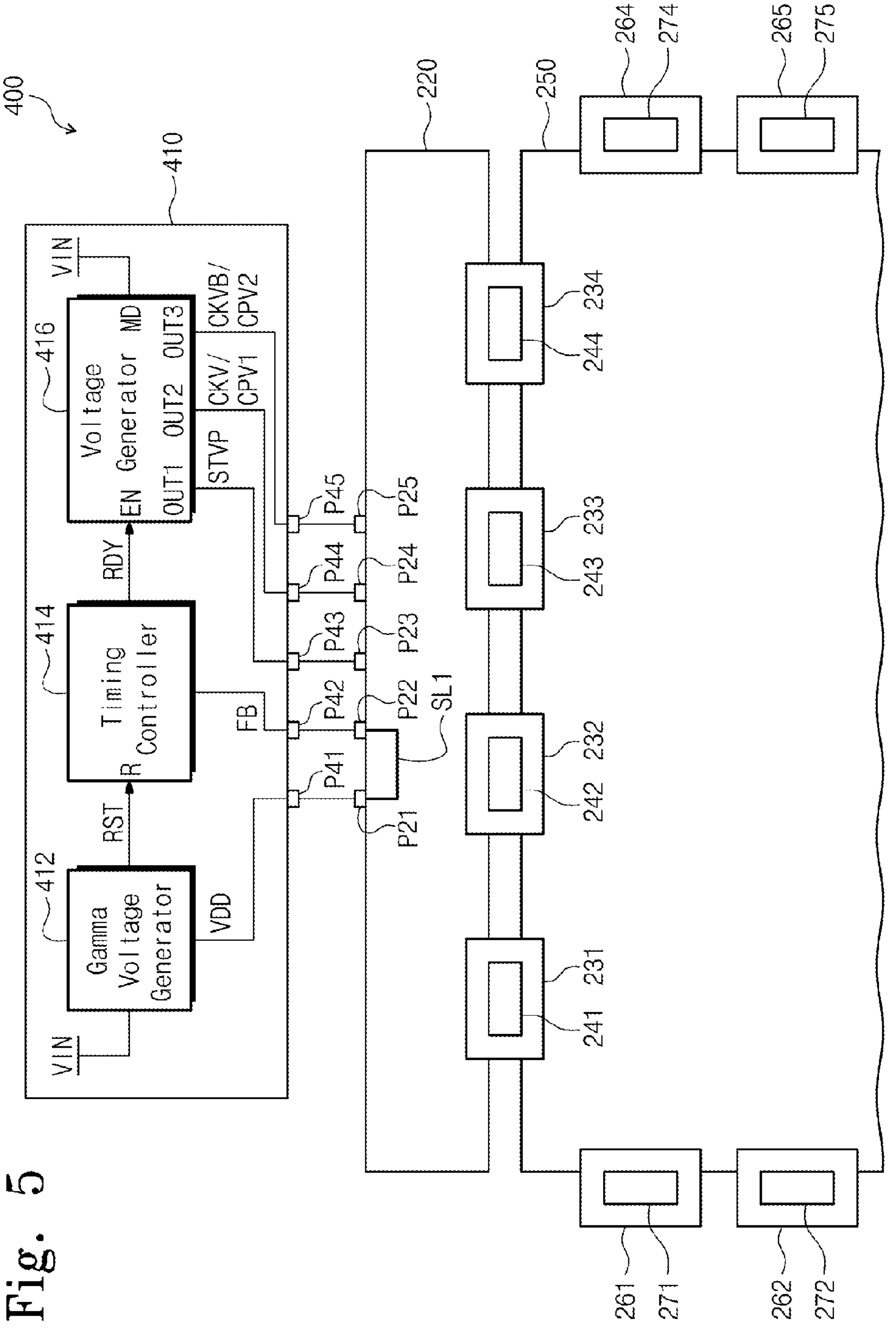
FIG. 5 is a plan view showing a display device according to an exemplary embodiment of the present invention.

FIG. 5 is a plan view showing a display device according to an exemplary embodiment of the present disclosure. A display device 400 includes a control board 410. The control board 410 includes a gamma voltage generator 412, a timing controller 414, a voltage generator 416, and first to fifth terminals P41 to P45.

The gamma voltage generator 412 generates a source voltage VDD in response to an input voltage VIN, and applies a reset signal RST to the timing controller 414. The source voltage VDD generated by the gamma voltage generator 412 is applied to the first terminal P41.

The timing controller 414 is driven in response to the reset signal RST applied through a reset terminal R thereof, and outputs a ready signal RDY in response to a feedback signal FB provided through the second terminal P42. When a drive mode set in the timing controller 414 is the first mode, and the feedback signal FB has the level of the source voltage VDD, the timing controller 414 outputs the ready signal RDY having the level of the ground voltage VSS. In addition, when the drive mode set in the timing controller 412 is the first mode, and the feedback signal FB does not have the level of the source voltage VDD, the timing controller 414 outputs the ready signal RDY having the level of the source voltage VDD. When the drive mode set in the timing controller 414 is the second mode, the timing controller 414 does not output the ready signal RDY, regardless of the level of the feedback signal FB. In other exemplary embodiments, when the drive mode set in the timing controller 414 is the second mode, the timing controller 414 may output the ready signal RDY having the level of the ground voltage VSS.

The voltage generator 416 includes an enable terminal EN, a mode terminal MD, and output terminals OUT1, OUT2, and OUT3. The voltage generator 416 responds to a ready signal RDY applied through the enable terminal EN in accordance with a signal applied through the mode terminal MD. In detail, when the signal applied through the mode terminal MD has a level of the input voltage VIN that indicates the first mode, the voltage generator 416 is driven in response to the ready signal RDY applied through the enable terminal EN. When the signal applied through the mode terminal MD has the level of the input voltage VIN that indicates the first mode and the ready signal RDY applied through the enable terminal EN has a level of the source voltage VDD, the voltage generator 416 outputs a start pulse signal STVP, a first gate clock signal CKV, and a second gate clock signal CKVB, which are suitable for the first mode, through the output signals OUT1, OUT2, and OUT3, respectively. When the signal applied through the mode terminal MD has the level of the input voltage VIN that indicates the first mode and the ready signal RDY applied through the enable terminal EN does not have the level of the source voltage VDD, the voltage generator 416 does not output any signal through the output signals OUT1, OUT2, and OUT3.

When the signal applied through the mode terminal MD does not have the level of the input voltage VIN, the voltage generator 416 is driven in the second mode. The voltage generator 416 ignores the ready signal RDY applied through the enable terminal EN during the second mode. That is, during the second mode, the voltage generator 416 outputs the start pulse signal STVP, the first gate pulse signal CPV1, and the second gate pulse signal CPV2, which are suitable for the second mode, through the output terminals OUT1, OUT2, and OUT3, respectively, regardless of the ready signal RDY applied through the enable terminal EN.

The printed circuit board 220 and the display panel 250 included in the display device 400 shown in FIG. 5 have the same structure and function as those of the printed circuit board 220 and the display panel 250 shown in FIG. 3, and thus components similar to or corresponding to those shown in FIG. 3 will be assigned the same reference numerals and detailed descriptions thereof will be omitted.

The printed circuit board 220 connected to the second type of display panel 250 including the gate driving circuits 261 to 266, which are packaged in the TCP or the COF, includes a signal line SL1 to electrically connect the first terminal P21 and the second terminal P22.

When the first to fifth terminals P41 to P45 of the control board 410 are respectively connected to the first to fifth terminals P21 to P25 of the printed circuit board 220, the source voltage VDD generated by the gamma voltage generator 412 is applied to the timing controller 414 as the feedback signal FB through the first terminal P41 of the control board 410, the first terminal P21 of the printed circuit board 220, the signal line SL1, the second terminal P22 of the printed circuit board 220, and the second terminal P42 of the control board 410.

The timing controller 414 driven in the first mode applies the ready signal RDY having the level of the ground voltage VSS to the voltage generator 416 in response to the feedback signal FB having the level of the source voltage VDD. Thus, the voltage generator 416 does not output any signal through the output terminals OUT1, OUT2, and OUT3.

That is, when the control board 410 set to be driven in the first mode is connected to the second type of the display panel 250, the voltage generator 416 of the control board 410 stops generating the voltage. Thus, the gate driving circuits 261 to 266 of the display panel 250 may be prevented from being damaged due to the first and second gate clock signals CKV and CKVB having the high voltage level.

Figure 6:
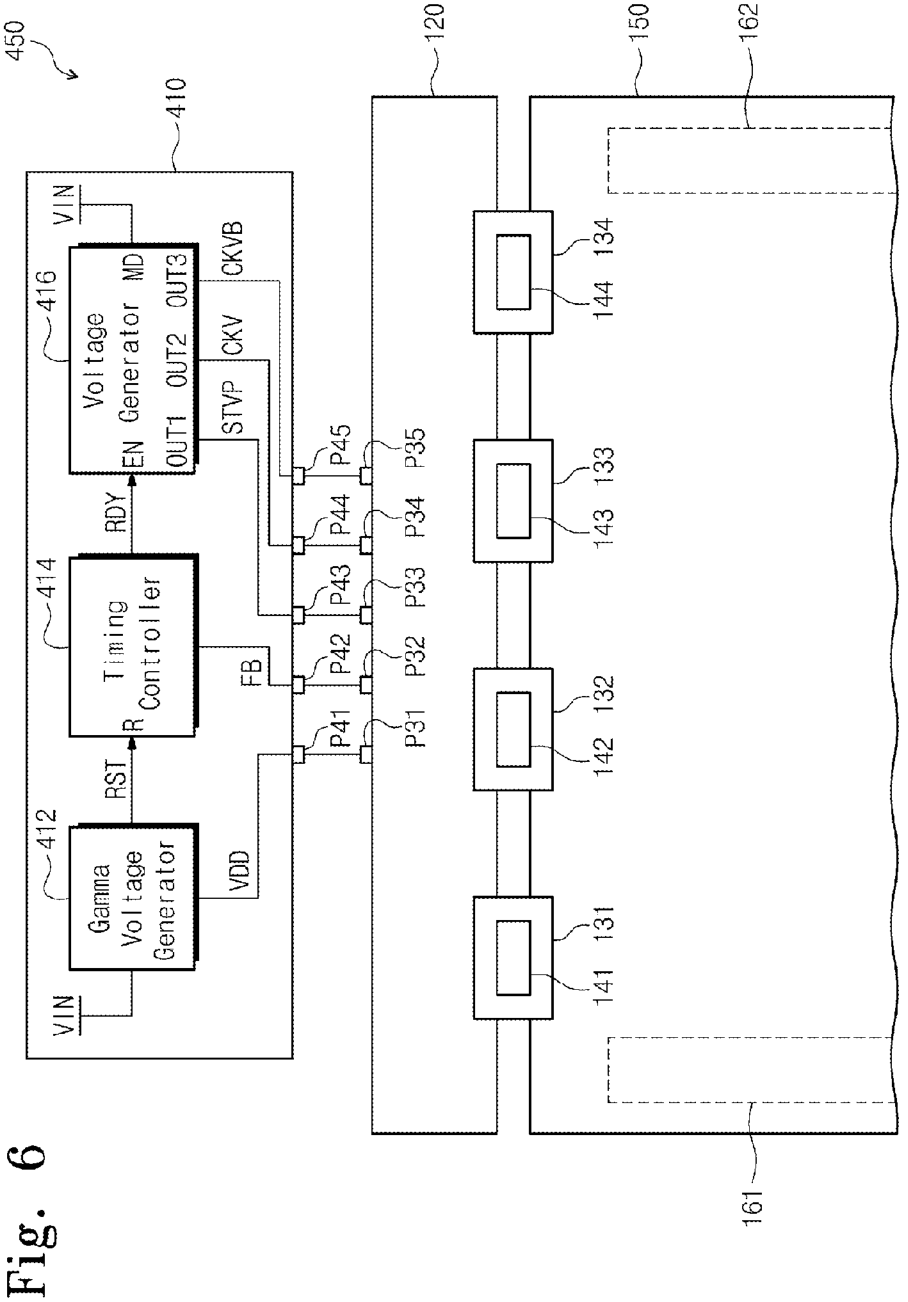
FIG. 6 is a plan view showing the type of display panel shown in FIG. 1, which is connected to the control board shown in FIG. 5.

FIG. 6 is a plan view showing the first type of display panel shown in FIG. 1, which is connected to the control board shown in FIG. 5. The display panel 450 includes a control board 410, a printed circuit board 120, data driving circuits 131 to 134, and a display panel 150. The printed circuit board 120 connected to the display panel 150, including the gate driving circuits 161 and 162, which are presented in a circuit made of an oxide semiconductor, an amorphous silicon gate, a crystalline semiconductor, or a polycrystalline semiconductor, includes first to fifth terminals P31 to P35.

Unlike the printed circuit board 220 shown in FIG. 5, the printed circuit board 120 shown in FIG. 6 does not include a signal line used to connect the first terminal P31 and the second terminal P32. Therefore, although the terminals P41 to P45 of the control board 410 are electrically connected to the terminals P31 to P35 of the printed circuit board 120, respectively, the feedback signal FB provided through the second terminal P42 of the control board 410 is maintained in a floating state. Accordingly, the timing controller 414 outputs the ready signal RDY having the level of the source voltage VDD. Thus, the voltage generator 416 outputs the start pulse signal STVP, the first gate clock signal CKV, and the second clock signal CKVB suitable for the first type of display panel 150 through the output terminals OUT1, OUT2, and OUT3. In other exemplary embodiments, the second terminal P32 of the printed circuit board 120 may be connected to the ground voltage VSS through a pull-down resistor.

Figure 7:
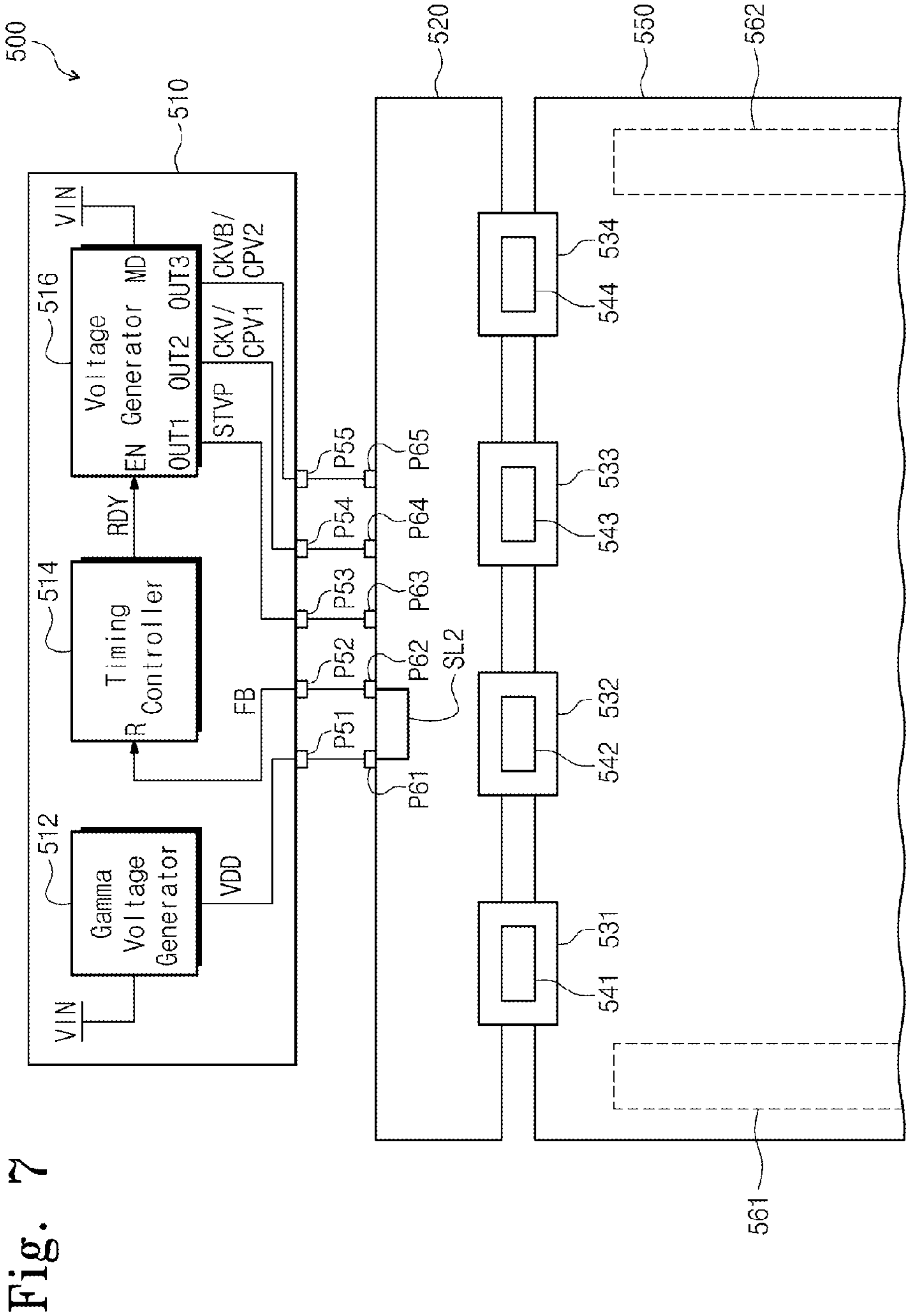
FIG. 7 is a plan view showing a display device according to an exemplary embodiment of the present invention.

FIG. 7 is a plan view showing a display device according to another exemplary embodiment of the present disclosure. A display device 500 includes a control board 510, a printed circuit board 520, data driving circuits 531 to 534, and a display panel 550. The control board 510 includes a gamma voltage generator 512, a timing controller 514, a voltage generator 516, and first to fifth terminals P51 to P55.

The gamma voltage generator 512 generates a source voltage VDD in response to an input voltage VIN. The source voltage VDD generated by the gamma voltage generator 512 is applied to the first terminal P51. The feedback signal FB applied through the second terminal P42 of the control board 510 is applied to a reset terminal of the timing controller 514. The timing controller 514 is driven when the feedback signal FB input to the reset terminal R has the level of the source voltage VDD and outputs a ready signal RDY having the level of the source voltage VDD. When the feedback signal FB input to the reset terminal R does not have the level of the source voltage VDD, the timing controller 514 is not driven.

The voltage generator 516 includes an enable terminal EN, a mode terminal MD, and output terminals OUT1, OUT2, and OUT3. The voltage generator 516 responds to the ready signal RDY applied through the enable terminal EN in accordance with a signal applied through the mode terminal MD. In detail, when the signal applied through the mode terminal MD has the level of the input voltage VIN that indicates the first mode, the voltage generator 516 is driven in response to the ready signal RDY applied through the enable terminal EN. When the signal applied through the mode terminal MD has the level of the input voltage VIN that indicates the first mode and the ready signal RDY applied through the enable terminal EN has the level of the source voltage VDD, the voltage generator 516 outputs a start pulse signal STVP, a first gate clock signal CKV, and a second gate clock signal CKVB, which are suitable for the first mode, through the output signals OUT1, OUT2, and OUT3, respectively. When the signal applied through the mode terminal MD has the level of the input voltage VIN that indicates the first mode and the ready signal RDY applied through the enable terminal EN does not have the level of the source voltage VDD, the voltage generator 516 does not output any signal through the output signals OUT1, OUT2, and OUT3.

When the signal applied through the mode terminal MD does not have the level of the input voltage VIN, the voltage generator 516 is driven in the second mode. The voltage generator 516 ignores the ready signal RDY applied through the enable terminal EN during the second mode. That is, during the second mode, the voltage generator 516 outputs the start pulse signal STVP, the first gate pulse signal CPV1, and the second gate pulse signal CPV2, which are suitable for the second mode, through the output terminals OUT1, OUT2, and OUT3, respectively, regardless of the ready signal RDY applied through the enable terminal EN.

The printed circuit board 520 and the display panel 550 included in the display device 500 shown in FIG. 7 have the similar structure and function as those of the printed circuit board 220 and the display panel 250 shown in FIG. 4.

The printed circuit board 520 is connected to the display panel 550 including the gate driving circuits 561 and 562, which are packaged in the TCP or the COF and are integrated in the non-display area NDA. The printed circuit board 520 includes first to fifth terminals P61 to P65 and a signal line SL2 used to electrically connect the first terminal P61 and the second terminal P65.

When the first to fifth terminals P51 to P55 of the control board 510 are respectively connected to the first to fifth terminals P61 to P65 of the printed circuit board 520, the source voltage VDD generated by the gamma voltage generator 512 is applied to the timing controller 514 as the feedback signal FB through the first terminal P51 of the control board 510, the first terminal P61 of the printed circuit board 520, the signal line SL2, the second terminal P62 of the printed circuit board 520, and the second terminal P52 of the control board 510.

The timing controller 514 is reset in response to the feedback signal FB having the level of the source voltage VDD. The timing controller 514 outputs the ready signal RDY having the level of the source voltage VDD to the voltage generator 516. Thus, the voltage generator 516 outputs the start pulse signal STVP, the first gate clock signal CKV, and the second gate clock signal CKVB through the output terminals OUT1, OUT2, and OUT3, respectively, which are suitable for the first type of display panel 550.

Figure 8:
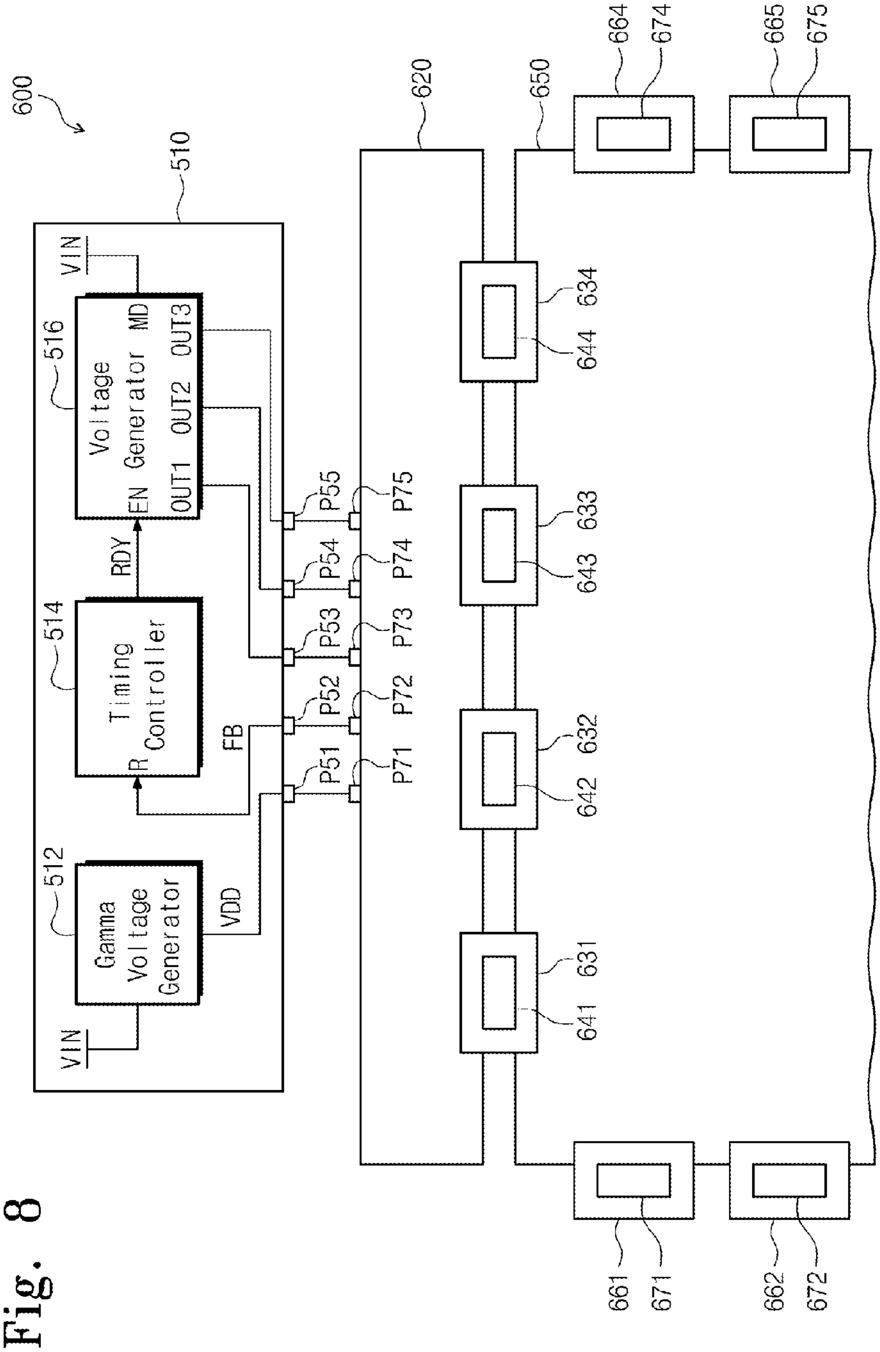
FIG. 8 is a plan view showing another type of display panel shown in FIG. 2, which is connected to the control board shown in FIG. 7.

FIG. 8 is a plan view showing the second type of display panel shown in FIG. 2, which is connected to the control board shown in FIG. 7. A display device 600 includes a control board 510, a printed circuit board 620, data driving circuits 631 to 634, a display panel 650, and gate driving circuits 661, 662, 664, and 665.

The printed circuit board 620 connected to the second type of display panel 650, including the gate driving circuits 661, 662, 664, and 665, which are packaged in the TCP or the COF, includes first to fifth terminals P71 to P75. The printed circuit board 620 does not include a signal line used to connect the first terminal P71 and the second terminal P72 in this embodiment. Therefore, although the terminals P51 to P55 of the control board 510 are electrically connected to the terminals P71 to P75 of the printed circuit board 620, respectively, the feedback signal FB provided through the second terminal P52 of the control board 510 is maintained in a floating state. Accordingly, the timing controller 514 is not reset and is maintained in a non-drive state. Thus, the voltage generator 516 does not output any signal through the output terminals OUT1, OUT2, and OUT3 thereof.

That is, when the control board 510 set to be driven in the first mode is connected to the second type of the display panel 650, the voltage generator 516 of the control board 510 stops generating the voltage. Thus, the gate driving circuits 661, 662, 664, and 665 of the display panel 650 may be prevented from being damaged due to the first and second gate clock signals CKV and CKVB having the high voltage level.

According to the above, the control board may be applied to various types of display panels. In particular, the control board detects the type of the display panel connected thereto, and thus the display panel may be prevented from being damaged even though the drive mode of the control board is different from the type of the display panel.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A control board comprising a control circuit configured to output a control signal and an image signal through terminals, and to generate a drive voltage in response to a feedback signal that is fed back to a second terminal of the terminals when a source voltage is applied to a first terminal of the terminals, wherein a voltage level of the feedback signal is the same as the source voltage.

2. The control board of claim 1, wherein the control circuit comprises:

- a gamma voltage generator configured to generate the source voltage;
- a timing controller configured to output a mode signal;
- a switch configured to generate a voltage ready signal in response to the feedback signal and the mode signal; and a voltage generator configured to generate the drive voltage in response to the voltage ready signal.

3. The control board of claim 2, wherein the switch comprises:

a first transistor comprising:

a first electrode connected to the feedback signal;

a second electrode connected to a first node; and a gate electrode connected to the mode signal; and a second transistor comprising:

a first electrode connected to the source voltage;

a second electrode connected to a ground voltage; and a gate electrode connected to the first node, and wherein a signal output from the first electrode of the second transistor is applied to the voltage generator as the voltage ready signal.

4. The control board of claim 1, wherein the control circuit comprises:

a gamma voltage generator configured to generate the source voltage;

a timing controller configured to generates a voltage ready signal in response to the feedback signal; and a voltage generator configured to generate the drive voltage in response to the voltage ready signal.

5. The control board of claim 1, wherein the control circuit comprises:

a gamma voltage generator configured to generate the source voltage;

a timing controller configured to receive the feedback signal as a reset signal, and to generate a voltage ready signal; and a voltage generator configured to generate the drive voltage in response to the voltage ready signal.

6. The control board of claim 5, wherein the timing controller is configured not to output the voltage ready signal when the feedback signal has a voltage level not corresponding to a first level.

7. A display device, comprising:

a display panel;

a printed circuit board comprising:

first and second terminals; and a driving circuit configured to drive the display panel; and a control board comprising a third terminal connected to the first terminal and a fourth terminal connected to the second terminal, wherein:

the control board is configured to generate a drive voltage in response to a feedback signal fed back to the fourth terminal when a source voltage is applied to the third terminal; and a voltage level of the feedback signal is the same as the source voltage.

8. The display device of claim 7, wherein the control board is configured to generate the drive voltage when the feedback signal has a voltage level corresponding to a first level, and not to generate the drive voltage when the feedback signal has a voltage level not corresponding to the first level.

9. The display device of claim 7, wherein the printed circuit board further comprises a signal line to electrically connect the first terminal and the second terminal when the display panel is a first type and does not comprise the signal line to electrically connect the first terminal and the second terminal when the display panel is a second type.

10. The display device of claim 7, wherein the control board comprises:

a gamma voltage generator configured to generate the source voltage;

a timing controller configured to apply a control signal and an image signal to the driving circuit, and to output a mode signal;

a switch configured to generate a voltage ready signal in response to the feedback signal and the mode signal; and a voltage generator configured to generate the drive voltage in response to the voltage ready signal.

11. The display device of claim 10, wherein the switch comprises:

a first transistor comprising:

a first electrode connected to the feedback signal;

a second electrode connected to a first node; and a gate electrode connected to the mode signal; and a second transistor comprising:

a first electrode connected to the source voltage;

a second electrode connected to a ground voltage; and a gate electrode connected to the first node, and wherein a signal output from the first electrode of the second transistor is applied to the voltage generator as the voltage ready signal.

12. The display device of claim 7, wherein the control board comprises:

a gamma voltage generator configured to generate the source voltage;

a timing controller configured to generate a voltage ready signal in response to the feedback signal; and a voltage generator configured to generate the drive voltage in response to the voltage ready signal.

13. The display device of claim 7, wherein the control board comprises:

a gamma voltage generator configured to generate the source voltage;

a timing controller configured to receive the feedback signal as a reset signal, and to generate a voltage ready signal; and a voltage generator configured to generate the drive voltage in response to the voltage ready signal.

14. The display device of claim 13, wherein the timing controller is configured to not output the voltage ready signal when the feedback signal has a voltage level not corresponding to a first level.

15. The display device of claim 7, wherein:

the display panel comprises gate lines, data lines, and pixels, each being connected to a corresponding gate line of the gate lines and a corresponding data line of the data lines, and the driving circuit comprises a data driver configured to drive the data lines.

16. A display device, comprising:

a display panel;

a printed circuit board comprising:

first and second terminals;

a driving circuit configured to drive the display panel; and a signal line electrically connecting the first terminal and the second terminal when the display panel is a specific type; and a control board comprising a third terminal connected to the first terminal and a fourth terminal connected to the second terminal, wherein:

the control board is configured to generate a drive voltage in response to a feedback signal fed back to the fourth terminal when a source voltage is applied to the third terminal; and a voltage level of the feedback signal is the same as the source voltage.

17. The display device of claim 16, wherein the control board is configured to generate the drive voltage when the feedback signal has a voltage level corresponding to a first level, and not to generate the drive voltage when the feedback signal has a voltage level not corresponding to the first level.

18. The display device of claim 16, wherein the control board comprises:

a gamma voltage generator configured to generate the source voltage;

a timing controller configured to apply a control signal and an image signal to the driving circuit, and to output a mode signal;

a switch configured to generate a voltage ready signal in response to the feedback signal and the mode signal; and a voltage generator configured to generate the drive voltage in response to the voltage ready signal.

19. The display device of claim 18, wherein the switch comprises:

a first transistor comprising:

a first electrode connected to the feedback signal;

a second electrode connected to a first node; and a gate electrode connected to the mode signal; and a second transistor comprising:

a first electrode connected to the source voltage;

a second electrode connected to a ground voltage; and a gate electrode connected to the first node, and wherein a signal output from the first electrode of the second transistor is applied to the voltage generator as the voltage ready signal.

20. The display device of claim 16, wherein the control board comprises:

a gamma voltage generator configured to generate the source voltage;

a timing controller configured to generate a voltage ready signal in response to the feedback signal; and a voltage generator configured to generate the drive voltage in response to the voltage ready signal.

* * * * *